US008082072B2

(12) United States Patent
Egami et al.

(10) Patent No.: US 8,082,072 B2
(45) Date of Patent: Dec. 20, 2011

(54) CONTROL APPARATUS FOR ELECTRIC VEHICLES

(75) Inventors: Tsuneyuki Egami, Gamagori (JP); Shingo Kawasaki, Kariya (JP)

(73) Assignee: Denso Corporation, Kariya (JP)

( * ) Notice: Subject to any disclaimer, the term of this patent is extended or adjusted under 35 U.S.C. 154(b) by 973 days.

(21) Appl. No.: 12/034,916

(22) Filed: Feb. 21, 2008

(65) Prior Publication Data
US 2008/0281480 A1 Nov. 13, 2008

(30) Foreign Application Priority Data

May 9, 2007 (JP) ................. 2007-124336

(51) Int. Cl.
*B60L 15/08* (2006.01)
*B60L 11/08* (2006.01)
(52) U.S. Cl. ...................... 701/22; 903/906; 180/65.285; 318/148
(58) Field of Classification Search ............. 701/22
See application file for complete search history.

(56) References Cited

U.S. PATENT DOCUMENTS

| 3,477,002 | A | * | 11/1969 | Campbell | 318/801 |
|---|---|---|---|---|---|
| 3,551,779 | A | * | 12/1970 | Campbell | 363/137 |
| 4,316,132 | A | * | 2/1982 | Geppert | 318/723 |
| 4,371,824 | A | * | 2/1983 | Gritter | 318/722 |
| 4,495,451 | A | * | 1/1985 | Barnard | 318/150 |
| 4,590,413 | A | * | 5/1986 | Gritter et al. | 318/803 |
| 7,099,756 | B2 | | 8/2006 | Sato | |
| 7,212,891 | B2 | * | 5/2007 | Sato | 701/22 |
| 7,609,023 | B2 | * | 10/2009 | Egami et al. | 318/801 |
| 2003/0155878 | A1 | * | 8/2003 | Murai | 318/268 |
| 2004/0160201 | A1 | * | 8/2004 | Rahman et al. | 318/41 |
| 2005/0173167 | A1 | * | 8/2005 | Seely et al. | 180/65.1 |
| 2006/0176059 | A1 | * | 8/2006 | Mir et al. | 324/503 |
| 2007/0119634 | A1 | | 5/2007 | Egami et al. | |
| 2007/0125582 | A1 | * | 6/2007 | Egami et al. | 180/54.1 |
| 2007/0126385 | A1 | * | 6/2007 | Egami et al. | 318/432 |
| 2007/0145926 | A1 | | 6/2007 | Egami et al. | |
| 2007/0145927 | A1 | * | 6/2007 | Egami et al. | 318/432 |
| 2007/0194763 | A1 | | 8/2007 | Egami et al. | |
| 2008/0064558 | A1 | * | 3/2008 | Sheidler et al. | 477/3 |
| 2008/0065301 | A1 | * | 3/2008 | Sheidler et al. | 701/54 |
| 2008/0218111 | A1 | * | 9/2008 | Okamura | 318/453 |
| 2008/0281480 | A1 | * | 11/2008 | Egami et al. | 701/22 |

OTHER PUBLICATIONS

U.S. Appl. No. 11/950,768, filed Dec. 5, 2007 (unpublished).
U.S. Appl. No. 12/068,595, filed Feb. 8, 2008 (unpublished).

\* cited by examiner

*Primary Examiner* — Thomas G. Black
*Assistant Examiner* — Shelley Chen
(74) *Attorney, Agent, or Firm* — Nixon & Vanderhye PC

(57) ABSTRACT

A motor control unit controls the input electric power of a MG unit to thereby suppress variations of a system voltage and stabilize the system voltage. The torque control of an AC motor and the input electric power control of the MG unit are executed independently from each other, so that the torque control and the input electric power control are stabilized. Further, torque variation zeroing control for correcting a phase of a pulse waveform voltage is executed so that a difference between a first estimated torque computed based on a torque control detection current vector of the AC motor and a second estimated torque computed based on a detection motor current vector is reduced to zero. Thus, uncomfortable torque variation is suppressed in a transient condition of the input electric power control of the MG unit.

2 Claims, 4 Drawing Sheets

CONTROL APPARATUS FOR ELECTRIC VEHICLES

CROSS REFERENCE TO RELATED APPLICATION

This application is based on and incorporates herein by reference Japanese Patent Application No. 2007-124336 filed on May 9, 2007.

FIELD OF THE INVENTION

The present invention relates to a control apparatus for an electric vehicle including a system for converting a voltage supplied by a DC power source into a system voltage by using a voltage converter and for driving an AC motor by applying the system voltage to the AC motor through an inverter.

BACKGROUND OF THE INVENTION

As disclosed in documents such as U.S. Pat. No. 7,099,756 (JP 2004-274945A), in an electric vehicle having AC motors mounted therein to serve as an energy source of the vehicle, the AC motors are each capable of serving as a motor for driving wheels of the vehicle as well as a motor driven by an engine to generate power. As the above system, a control apparatus for the electric vehicle includes a voltage boosting converter for raising a voltage supplied by a DC power source, which is implemented by a secondary battery, to a high DC voltage appearing on a power supply line connected to the AC motors through inverters. The inverters are capable of serving as a component for converting the raised DC voltage appearing on the power supply line into an AC voltage for driving one of the AC motors as well as a component for converting the AC voltage into a DC voltage supplied back or restored to the secondary battery through the voltage boosting converter, which lowers the level of the DC voltage.

In the above system, in order to stabilize the voltage appearing on the power supply line, the voltage boosting converter controls the voltage appearing on the power supply line to a target voltage. Further, at the same time, a smoothing capacitor connected to the power supply line smoothes the voltage appearing on the power supply line.

When a relation between electric power driving one of the AC motors and electric power generated by the other AC motor considerably varies due to changes in vehicle operating state or another reason, however, a voltage variation caused by a change in such relation as a voltage variation of the power supply line cannot be absorbed by the voltage boosting converter and/or the smoothing capacitor. Thus, the voltage appearing on the power supply line becomes excessively high. As a result, it is likely that electronic equipment connected to the power supply line is damaged. In order to cope with this problem, there is provided a method for enhancing the effect of stabilizing the voltage appearing on the power supply line by using an improved voltage boosting converter with better performance and a smoothing capacitor with a larger capacitance. By adoption of this method, however, the voltage boosting converter with better performance and the smoothing capacitor with a larger capacitance will inevitably raise the cost of the control apparatus for an electric vehicle. Thus, demands for a system having a small size and a low cost cannot be met. The above relation between the power driving one of the AC motors and the power generated by the other AC motor is also referred to as a balance of power between the power driving one of the AC motors and the power generated by the other AC motor.

It is proposed for controlling the inverter to make a sum of energies (or balance of electric power) of the two AC motors equal to 0 at the time the connection between the DC power source and the voltage boosting converter is cut off by using a relay in the event of a failure occurring in the DC power source. However, this method is provided as a countermeasure to a failure occurring in the DC power source and is capable of enhancing the effect of stabilizing the voltage appearing on the power supply line in a normal state of the power supply. In addition, even if an attempt is made to control the inverter to make the sum of energies (or the balance of power) of the two AC motors equal to 0 in a normal state, it is difficult to control the inverter to make the sum of energies (or the balance of power) of the two AC motors equal to 0 in the following cases.

In the first place, one of the AC motors is linked to a driving shaft of the electric vehicle and the other AC motor is linked to an output shaft of the internal combustion engine, that is, the two AC motors are linked to members having different operations. In the second place, the effect of a processing delay of the control executed on the inverter becomes larger, for example, during a transient condition in which the operating state of the electric vehicle changes. The AC motor linked to the internal combustion engine is not capable of obviating power variations caused by changes of a torque generated by the internal combustion engine. This fact makes it even more difficult to control the inverter to make the sum of energies of the two AC motors equal to zero (0).

SUMMARY OF THE INVENTION

It is thus an object of the present invention to improve a control apparatus for an electric vehicle to be capable of stabilizing a voltage appearing on a power supply line in small size and low cost and to be capable of reducing a torque variation to nearly zero in a transient condition of controlling an input power to a motor unit.

According to one aspect, in a control apparatus for an electric vehicle, a voltage supplied by a DC power source into a system voltage appearing on a power supply line is converted and an MG unit includes an inverter connected to the power supply line and drives an AC motor. A torque of the AC motor and an input electric power of the MG unit are controlled by supplying the AC motor with a pulse waveform voltage, which commutates the AC motor at every predetermined electric angle, based on a torque command value of the AC motor and an input electric power command value of the MG unit. The system voltage is stabilized by outputting the input electric power command value to the torque and power control means, so that a system voltage variation which is a variation from a target value of the system voltage is suppressed by input electric power control of the MG unit.

Specifically, in controlling the torque and the input electric power of the MG unit, a torque control detection current related to torque control of the AC motor is separated from a detection motor current flowing in the AC motor. A first estimated torque of the AC motor is computed based on the torque control detection current, a torque control phase command value of the pulse waveform voltage is set based on the first estimated torque and the torque command value, and both of the torque control phase command value and a predetermined duty ratio are output as torque control pulse waveform information. Both a phase correction value and a duty ratio correction value are set and output as electric power control pulse waveform information. The electric power control pulse waveform information is for correcting the torque control pulse waveform information so that the input electric power of the MG unit is controlled to the input electric power command value independently of the input electric power of the MG unit required to generate torque of the AC motor based on the torque command value and the input electric power command value. A pulse waveform voltage signal, which is to be applied to the AC motor, is output to the inverter based on the torque control pulse waveform information, the electric power control pulse waveform information and the electric angle of the AC motor. A second estimated torque of the AC motor is computed based on the detection motor current, and a difference between the first estimated torque and the second estimated torque is controlled to zero substantially, thereby to suppress torque variation of the AC motor in a transient condition of input electric power control of the MG unit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
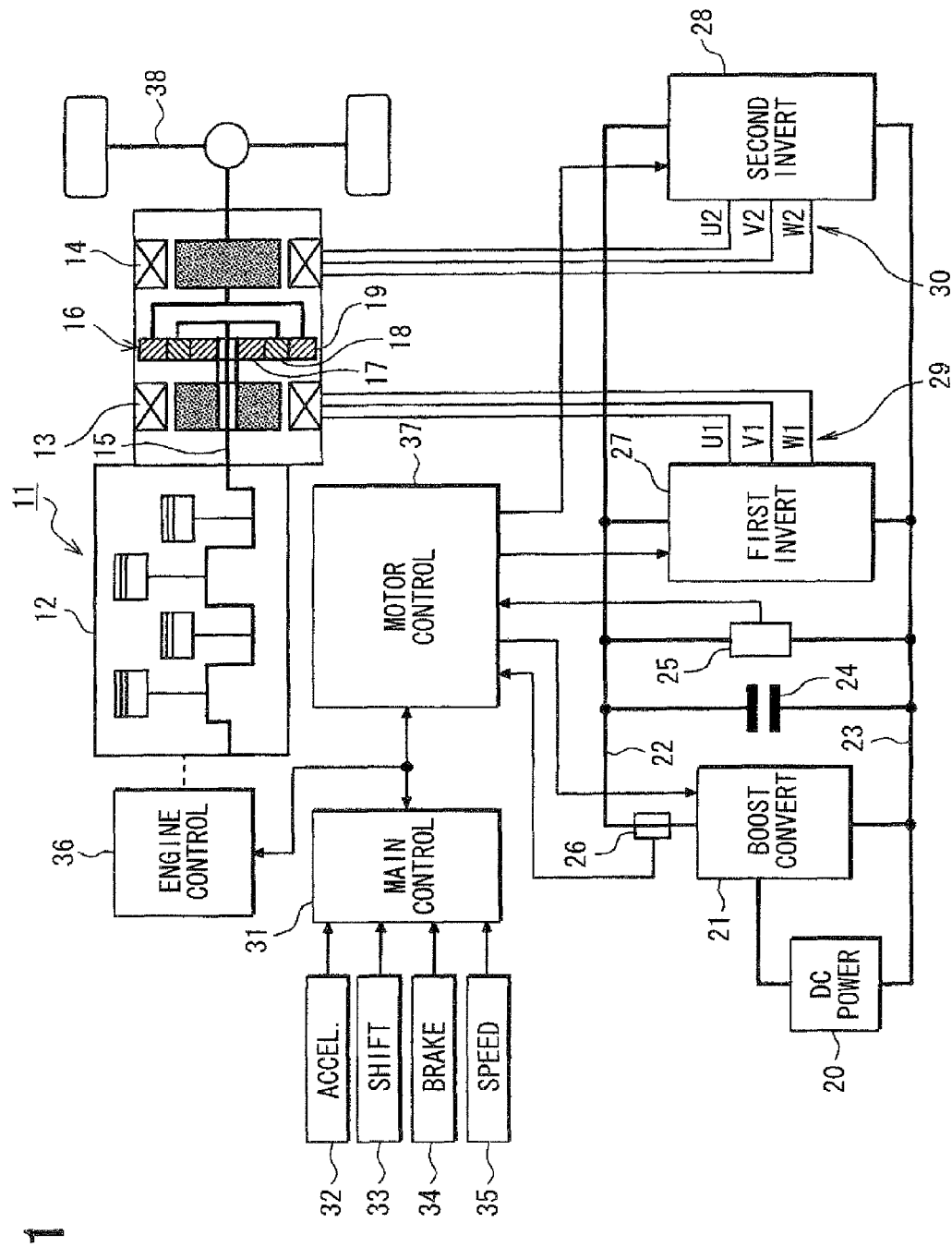
FIG. 1 is a block diagram showing a driving system for an electric vehicle in accordance with one embodiment of the present invention.

Referring first to FIG. 1, an electric vehicle 11 has an internal combustion engine 12 in addition to a first AC motor 13 and a second AC motor 14. Thus, the electric vehicle 11 is an engine/motor hybrid vehicle. The engine 12 and the second AC motor 14 are employed as drive power sources for driving the electric vehicle 11. Power generated by a crankshaft 15 of the engine 12 is divided into two paths by a planetary gear set 16. The planetary gear set 16 includes a sun gear 17, a planetary gear 18 and a ring gear 19. The sun gear 17 rotates at its radial center. The planetary gear 18 rotates along a circumference external to the sun gear 17 while revolving around its radial center. The ring gear 19 rotates along a circumference external to the planetary gear 18. The planetary gear 18 is linked to the crankshaft 15 of the engine 12 through a carrier not shown in the figure. On the other hand, the ring gear 19 is linked to a rotation shaft of the second AC motor 14. The sun gear 17 is linked to the first AC motor 13.

A secondary battery serving as a DC power source 20 is connected to a voltage boosting converter 21. The voltage boosting converter 21 is a component having a function for increasing a DC voltage output by the DC power source 20 in order to generate a DC system voltage supplied between an electric power supply line 22 and a ground line 23 as well as a function for decreasing the system voltage in order to return or restore power to the DC power source 20. A smoothing capacitor 24 for smoothing the system voltage and a voltage sensor 25 serving as a voltage detection means for detecting a value of the system voltage are connected between the power supply line 22 and the ground line 23. A current sensor 26 serving as a current detection means is placed on the power supply line 22 as a means for detecting a current flowing through the power supply line 22.

In addition, a three-phase first inverter 27 and a three-phase second inverter 28 are also connected between the power supply line 22 and the ground line 23. The three-phase first inverter 27 and the three-phase second inverter 28 are each a three-phase inverter of a voltage control type. The three-phase first inverter 27 drives the first AC motor 13, whereas the three-phase second inverter 28 drives the second AC motor 14. The three-phase first inverter 27 and the first AC motor 13 form a first motor driving unit 29, which operates as a first MG unit 29. Similarly, the three-phase second inverter 28 and the second AC motor 14 form a second motor driving unit 30, which operates as a second MG unit 30.

A main control unit 31 is a computer for executing overall control on the electric vehicle. The main control unit 31 acquires signals output by a variety of sensors and switches in order to detect an operating state of the electric vehicle. The sensors and the switches include an accelerator sensor 32, a shift position switch 33, a brake switch 34 and a vehicle speed sensor 35. The accelerator sensor 32 is a sensor for detecting an accelerator operation amount representing an operation amount of an acceleration pedal. The shift position switch 33 is a sensor for detecting gear shift position of the electric vehicle. The gear shift position can be a parking position (P), a reverse driving position (R), a neutral position (N) or a forward driving position (D). The brake switch 34 is a switch for detecting a braking operation. The vehicle speed sensor 35 is a sensor for detecting a value of the travel speed of the electric vehicle. The main control unit 31 exchanges control and data signals with an engine control unit 36 and a motor control unit 37, driving the engine control unit 36 and the motor control unit 37 to control the engine 12, the first AC motor 13 and the second AC motor 14 in accordance with the operating state of the electric vehicle. The engine control unit 36 is for controlling the operation of the engine 12, whereas the motor control unit 37 is for controlling the operations of the first AC motor 13 and the second AC motor 14.

Next, control of the first AC motor 13 and the second AC motor 14 is described by referring to FIGS. 2 to 5. The first AC motor 13 and the second AC motor 14 are each a three-phase permanent-magnet synchronous motor having a permanent magnet in its inside. The first AC motor 13 and the second AC motor 14 have respectively rotor rotation position sensors 39 and 40 each used for detecting the rotation position of the rotor of the motor. On the basis of three-phase voltage command signals UU1, UV1 and UW1 output by the motor control unit 37, the first inverter 27 of the voltage control type converts the DC system voltage appearing on the power supply line 22 into three-phase AC voltages U1, V1 and W1 for driving the first AC motor 13. The DC system voltage appearing on the power supply line 22 is generated by the voltage boosting converter 21. A U-phase current sensor 41 is a sensor for detecting a U-phase current iU1 of the first AC motor 13, whereas a W-phase current sensor 42 is a sensor for detecting a W-phase current iW1 of the first AC motor 13.

Similarly, on the basis of three-phase voltage command signals UU2, UV2 and UW2 output by the motor control unit 37, the three-phase second inverter 28 of the voltage control type converts the DC system voltage appearing on the power supply line 22 into three-phase AC voltages U2, V2 and W2 for driving the second AC motor 14. A U-phase current sensor 43 is a sensor for detecting a U-phase current iU2 of the second AC motor 14, whereas a W-phase current sensor 44 is a sensor for detecting a W-phase current iW2 of the second AC motor 14.

It is to be noted that the first AC motor 13 and the second AC motor 14 each also function as an electric power generator, when the first AC motor 13 and the second AC motor 14 are driven by the three-phase first inverter 27 and the three-phase second inverter 28 respectively to generate a negative torque. For example, when the electric vehicle 11 is being decelerated, AC electric power generated by the second AC motor 14 as kinetic energy is converted into DC power by the three-phase second inverter 28 and the DC power is stored in the DC power source 20. Normally, a portion of mechanical power of the engine 12 is transferred to the first AC motor 13 by way of the planetary gear 18, causing the first AC motor 13 to operate as a generator for generating electric power corresponding to the portion of the power of the engine 12. The electric power generated by the first AC motor 13 is supplied to the second AC motor 14, causing the second AC motor 14 to operate as a motor. The power of the engine 12 is divided into two paths by the planetary gear set 16. When a torque applied to the ring gear 19 of the planetary gear set 16 is greater than a torque required by a running operation of the electric vehicle, the first AC motor 13 functions as a motor, drawing power for the engine 12. In this case, the second AC motor 14 functions as a generator generating power to be supplied to the first AC motor 13. Thus, each of the first AC motor 13 and the second AC motor 14 operates as a motor/generator (MG).

In the MG control, the motor control unit 37 executes torque control for the first AC motor 13, torque control for the second AC motor 14, and the system voltage stabilization control for controlling the input power of the second AC motor 14 so that variation or fluctuation in the system voltage may be suppressed. The motor control unit 37 executes the torque control for the second AC motor 14 and the input power control for the second MG unit 30 independently from each other. In this instance, the motor control unit 37 controls the second AC motor 14 not to vary its torque in the transient condition of the input power control of the second MG unit 30. For this purpose, the motor control unit 37 computes a first estimated torque of the second AC motor 14 based on a torque control detection current (detected current for torque control) related to the torque control of the second AC motor 14, and also computes a second estimated torque of the second AC motor 14 based on a detection motor current (detected motor current) flowing in the second AC motor 14. The motor control unit 37 then executes torque variation zeroing control so that a difference between the first estimated torque and the second estimated torque is controlled to zero substantially.

The motor control unit 37 executes motor control (torque control, system voltage stabilization control) and conversion power control as described below.

(Motor Control)

When the smoothing capacitor 24 has been sufficiently pre-charged, that is, pre-charging the smoothing capacitor 24 has been completed, after the start of system operation, the motor control unit 37 releases the motor control system from the shut-down state and executes the motor control (torque control, system voltage stabilization control).

Figure 2:
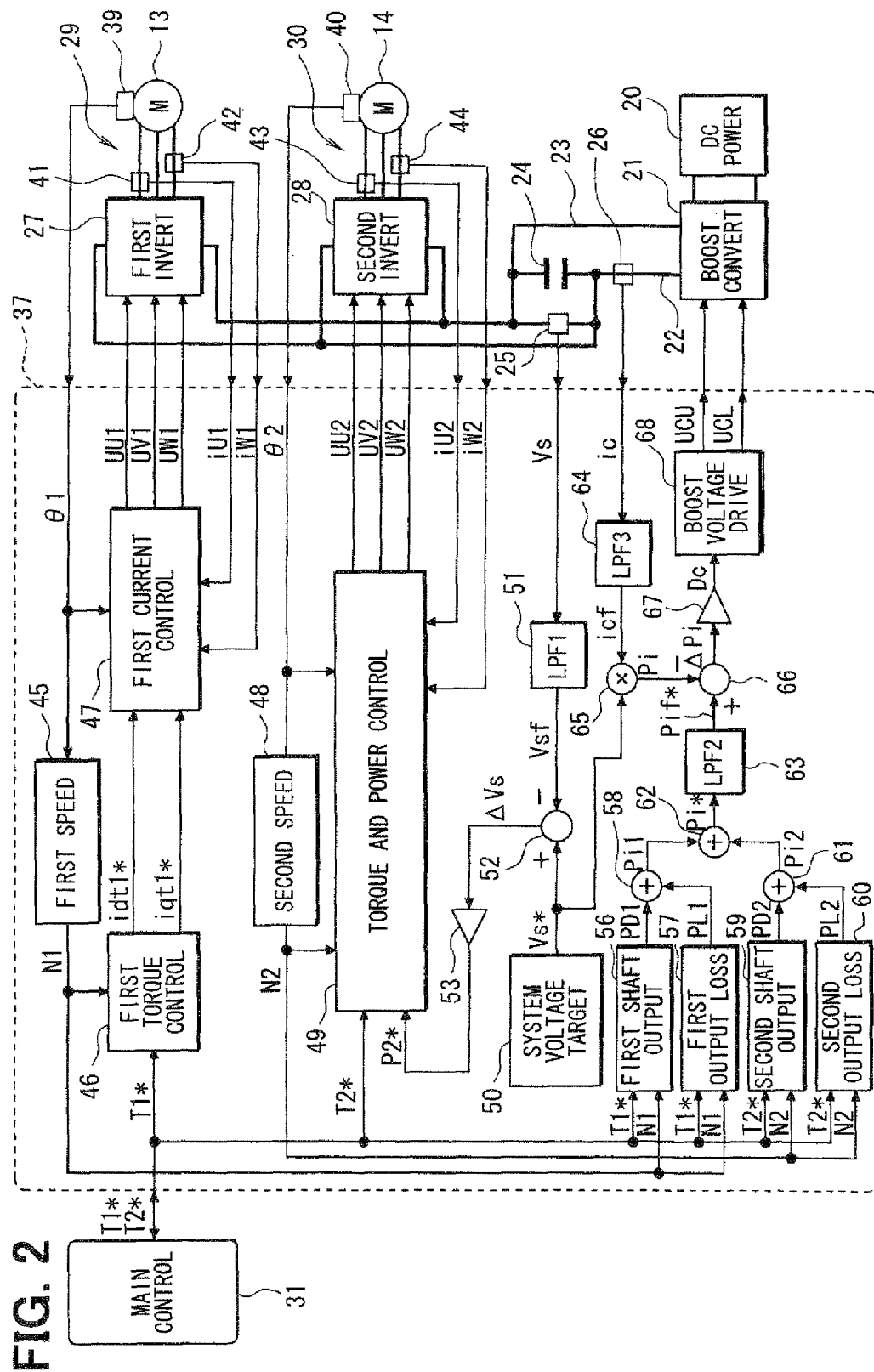
FIG. 2 is a block diagram showing a motor control apparatus of the driving system for an electric vehicle shown in FIG. 1.

As shown in FIG. 2, in execution of the torque control on the first AC motor 13, the motor control unit 37 generates the three-phase voltage command signals UU1, UV1 and UW1 by a sinusoidal-waveform PWM control method on the basis of a torque command value T1* output by the main control unit 31, the U-phase current iU1 and the W-phase current iW1 of the first AC motor 13 as well as the rotor rotation position θ1 of the first AC motor 13 as described below. The U-phase current iU1 and the W-phase current iW1 are signals output by the current sensors 41 and 42 respectively, whereas the rotor rotation position θ1 is a signal output by the rotor rotation position sensor 39.

The signal output by the rotor rotation position sensor 39 as the signal representing the rotor rotation position θ1 of the first AC motor 13 is supplied to a first rotation speed computation unit 45 for computing a first rotation speed N1 of the first AC motor 13. Then, in order to apply current feedback control to each of a d-axis current id1 and a q-axis current iq1 independently of each other in the d-q coordinate system set as a rotation coordinate system of the rotor of the first AC motor 13, a first torque control current computation unit 46 computes a torque control current vector it1* representing a d-axis torque control current idt1* and a q-axis torque control current iqt1* by using typically map data or a mathematical equation as a vector according to the torque command value T1* and the rotation speed N1 of the first AC motor 13.

Subsequently a first current control unit 47 computes an actual current vector i1 (d-axis current id1 and the q-axis current iq1) on the basis of the U-phase current iU1 and W-phase current iW1 of the first AC motor 13 as well as the rotor rotation position θ1 of the first AC motor 13 as described below. As described above, the U-phase current iU1 and the W-phase current iW1 are signals output by the current sensors 41 and 42 respectively, whereas the rotor rotation position θ1 is the signal output by the rotor rotation position sensor 39. Then, the first current control unit 47 computes a d-axis command voltage Vd1* by execution of proportional-and-integral (P-I) control for reducing a difference Δid1 between the d-axis torque control current idt1* and an actual d-axis current id1, and computes a q-axis command voltage Vq1* by execution of P-I control for reducing a difference Δiq1 between the q-axis torque control current iqt1* and an actual q-axis detection motor current iq1. Finally, the first current control unit 47 converts the d-axis command voltage Vd1* and the q-axis command voltage Vq1* into the three-phase voltages and further to pulse-width-modulated (PWM) three-phase voltage command signals UU1, UV1 and UW1, and then outputs the three-phase voltage command signals UU1, UV1 and UW1 to the first inverter 27.

Thus, the torque control for the first AC motor 13 is executed to realize the torque command value T1* output by the main control unit 31.

In execution of torque control on the second AC motor 14, on the other hand, the motor control unit 37 generates the three-phase voltage command signals UU2, UV2 and UW2 by a pulse (rectangular) waveform control method on the basis of a torque command value T2* output by the main control unit 31, the U-phase current iU2 and W-phase current iW2 of the second AC motor 14 as well as the rotor rotation position θ2 of the second AC motor 14. As described below, the U-phase current iU2 and the W-phase current iW2 are signals output by the current sensors 43 and 44 respectively, whereas the rotor rotation position θ2 is the signal output by the rotor rotation position sensor 40. Under the pulse waveform control method, the second AC motor 14 is controlled by commutating the current supply at every predetermined angle in terms of the electric angle of the second AC motor 14.

At this time, an input electric power of the second MG unit 30 is controlled to an input electric power command value P2* independently of an input electric power of the second MG unit 30 required for the torque generation of the second AC motor 14. Thus, the system voltage control is executed in order to suppress variations in the system voltage by controlling an input electric power of the second MG unit 30 (second AC motor 14) while sustaining the torque generated by the second AC motor 14 at a constant value (torque command value T2\*).

Specifically, first of all, the signal output by the rotor rotation position sensor 40 as the signal representing the rotor rotation position θ2 of the second AC motor 14 is supplied to a second rotation speed computation unit 48 for computing a rotation speed N2 of the second AC motor 14. Further, a system voltage target value computation unit 50 computes a target value Vs\* of the system voltage, whereas the voltage sensor 25 supplies a detection value Vs of the system voltage to a first low pass filter 51 for carrying out a low pass filtering process to pass only low frequency signal included in the detection value Vs of the system voltage. Subsequently, a subtractor 52 computes a difference ΔVs between the target value Vs\* of the system voltage and a detection value Vsf output by the low pass filtering process as the detection value of the system voltage, supplying the difference ΔVs to the a P-I controller (power operation amount computation means) 53 for computing by execution of P-I control an input electric power command value P2\* of the second AC motor 14 as an amount that reduces the difference ΔVs between the target value Vs\* of the system voltage and the detection value Vsf output by the low pass filtering process as the detection value of the system voltage.

Thereafter, the torque command value T2\* of the second AC motor 14, the input electric power command value P2\* for the second MG unit 30 and the like are input to a torque and power control unit 49.

Figure 3:
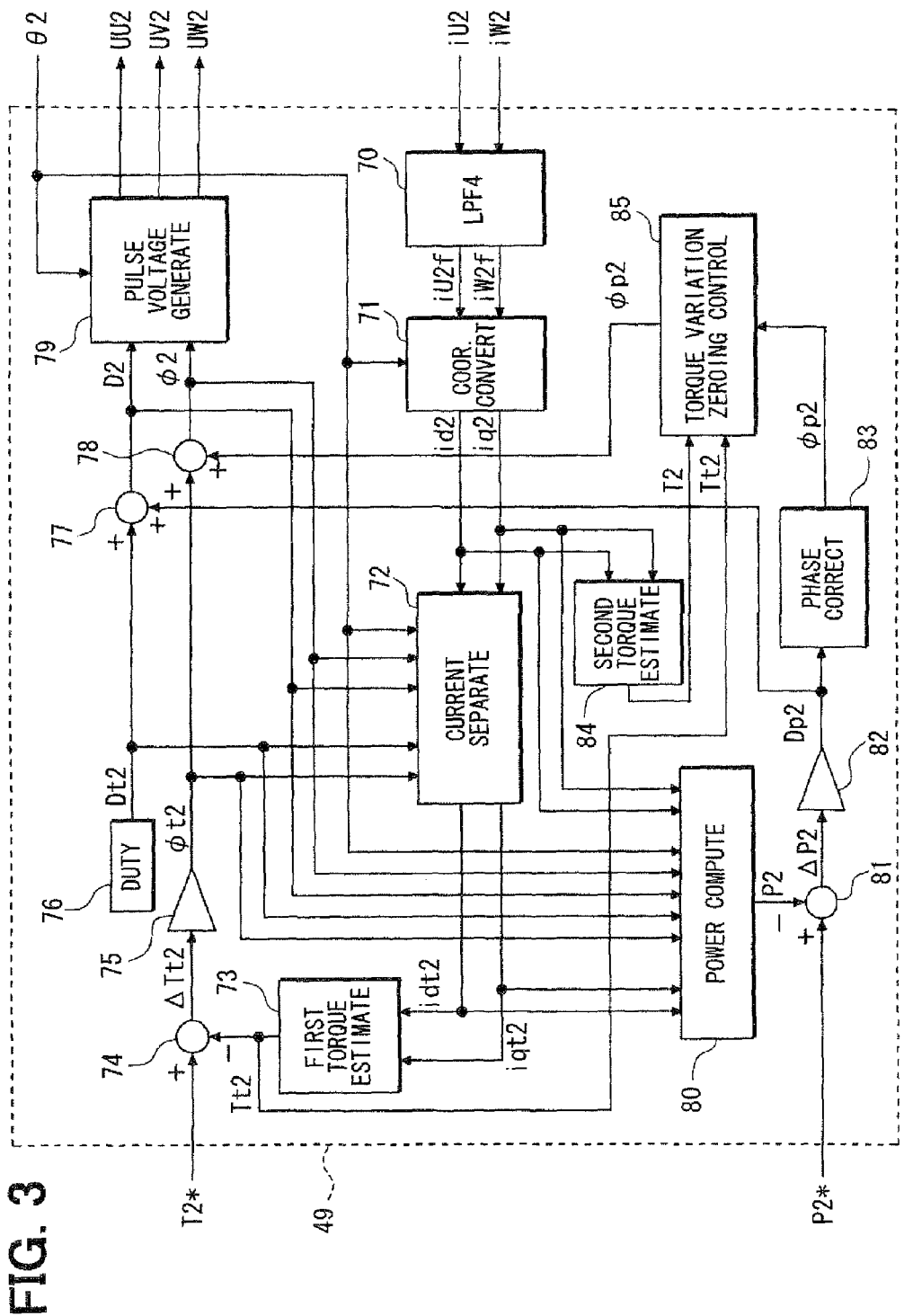
FIG. 3 is a block diagram showing a torque and power control unit of the motor control apparatus shown in FIG. 2.

As shown in FIG. 3, in this torque and power control unit 49, the current iU2 and iW2 (output signals of the current sensors 43 and 44) of the U-phase and W-phase of the second AC motor 14 are applied to a fourth low pass filter 70 to perform a low pass filtering process to pass only low frequency signal of the currents iU2 and iW2 of the U-phase and the W-phase of the second AC motor 14. Then, a coordinate conversion unit 71 computes a detection motor current vector i2 (d-axis detection motor current id2, a q-axis detection motor current iq2) of the current flowing in the second AC motor 14 in the rotor rotation coordinate system based on the U-phase current iUf2 and the W-phase current iWf2 of the second AC motor 14 after being subjected to the low pass filtering process and the rotor rotation position θ2 of the second AC motor 14.

For independently controlling the torque of the second AC motor 14 and the input electric power of the MG unit 30 from each other, a current separation unit 72 separates a torque control detection current vector it2 (d-axis detection current idt2, q-axis detection current iqt2) which is related to torque control from a detection motor current vector i2 (d-axis detection motor current id2, a q-axis detection motor current iq2).

Figure 4:
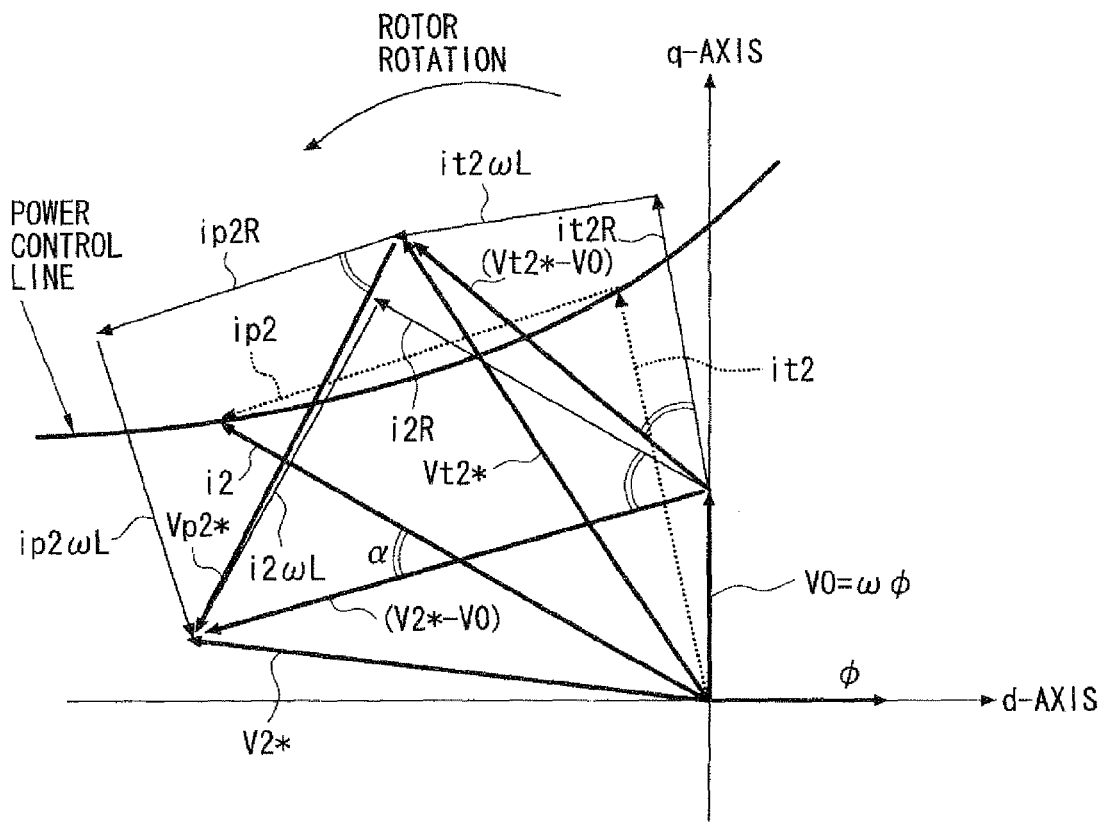
FIG. 4 is a graph showing a method of separating a detection current for torque control from a detection motor current.

Here, with reference to FIG. 4, a method of separating the detection motor current vector i2 into the torque control detection current vector it2 (torque control detection current vector it2) and the input electric power control detection current vector ip2 (detection current vector ip2 for input electric power control) is described.

Here, ω is an electrical angular velocity, L is an inductance, R is an armature coil resistance and φ is a linkage flux. A voltage vector V0 is computed by multiplying the electric angular velocity ω and the linkage flux φ.

A basic waveform voltage vector V2\* of a pulse waveform voltage applied to the second AC motor 14 is computed from final pulse waveform control information (final phase command value φ2, final duty ratio D2). A basic waveform voltage vector Vt2\* of the torque control pulse waveform voltage is computed from the basic waveform voltage vector V2\* of the pulse waveform voltage and torque control pulse waveform information (phase command value φt2 and basic duty ratio Dt2) described later.

Further, a basic waveform voltage vector Vp2\* of the input electric power control pulse waveform voltage is computed from the basic waveform voltage vector V2\* of the pulse waveform voltage and the basic waveform voltage vector Vt2\* of the input electric power control pulse waveform voltage.

At a moment when the phase difference is α between the voltage vector (V2\*−V0) and the current vector i2, and R and ωL are not almost changing, a triangle A formed by the three current vectors i2, it2 and ip2 is similar to a triangle B formed by the three voltage vectors (V2\*−V0), (Vt2\*−V0) and Vp2\*. Therefore, the similarity ratio R of the triangle A by the current vectors to the triangle B by the voltage vectors becomes a value obtained by dividing the magnitude of the current vector 12 by the magnitude of the voltage vector (V2\*−V0).

$$R = |i2|/|V2^* - V0|$$

That is, the triangle A formed by the three current vectors i2, it2 and ip2 is a triangle which works to advance the angle by α in the direction of each side of the triangle B formed by the three voltage vectors (V2\*−V0), (Vt2\*−V0) and Vp2\*, and to multiply each side by R times.

It is, therefore, possible to compute the torque control detection current vector it2 (d-axis detection current idt2, q-axis detection current iqt2) by computing a vector that advances the angle by α in the direction of the voltage vector (Vt2\*−V0) and multiplies the magnitude of the vector thereof by R times. It is, further, possible to compute the input electric power control detection current vector ip2 (d-axis detection current idp2, q-axis detection current iqp2) by finding a vector that advances the angle by α in the direction of the voltage vector Vp2\* and multiplies the magnitude of the vector thereof by R times.

Thus, as shown in FIG. 3, after separating the torque control detection current vector it2 is separated from the detection motor current vector i2 by the current separation unit 72, a first torque estimation unit 73 computes a first estimated torque Tt2, which is an estimated value of torque generated by the second AC motor 14, based on the torque control detection current vector it2 (d-axis detection current idt2, q-axis detection current iqt2) of the second AC motor 14.

Then, a subtractor 74 computes a difference ΔTt2 between the torque command value T2\* and the first estimated torque Tt2 of the second AC motor 14. This difference ΔTt2 is input to a P-I controller 75 thereby to compute the phase command value φt2 of the torque control pulse waveform voltage by the P-I control or the like so that the difference ΔTt2 between the torque command value T2\* and the first estimated torque Tt2 is reduced. A duty setting unit 76 sets a basic duty ratio Dt2 (for example, 50%) of the torque control pulse waveform voltage. These phase command value φt2 for torque control and the basic duty ratio Dt2 are output as the torque control pulse waveform information. Thus, the subtractor 74, P-I controller 75, duty setting unit 76 and the like operate as torque control means.

A power computation unit 80 computes an input electric power P2 of the second MG unit 30 based on the detection motor current vector i2 (id2, iq2) of the second AC motor 14, the torque control detection current vector it2 (idt2, iqt2), the torque control pulse waveform information (φt2, Dt2), the final pulse waveform control information (φ2, D2), the rotor rotation position θ2 and the like.

Then, a subtractor 81 computes a difference Δp2 between the input electric power command value P2* and the input electric power P2 of the second MG unit 30. This difference ΔP2 is input to a P-I controller 82 thereby to compute a duty correction value Dp2 by the P-I control or the like so that the difference ΔP2 between the input electric power command value P2* and the input electric power P2 is reduced. Thus, the duty correction value Dp2 is set to correct the torque control basic duty ratio Dt2 so that the input electric power P2 of the second MG unit 30 is controlled to the input electric power command value P2*.

A phase correction value computation unit 83 computes a phase correction value φp2 in correspondence to the duty correction value Dp2 mathematically or by using mapped data. The phase correction value φp2 for correcting the phase command value φt2 for torque control is set, so that the torque variation of the second AC motor 14 generated due to the correction of the duty ratio of the pulse waveform voltage by the duty correction value Dp2 is suppressed by the correction of the phase of the pulse waveform voltage. Then, a torque variation zeroing control unit 85 computes a final phase correction value φp2. These phase correction value φp2 and the duty ratio correction value Dp2 are output as the pulse waveform information for electric power control. Thus, the electric power computation unit 80, the subtractor 81, the P-I controller 82, the phase correction value computation unit 83 and the like operate as electric power control means.

After the torque control pulse waveform information (phase command value φt2, basic duty ratio Dt2) and the electric power control pulse waveform information (phase correction value φp2, duty ratio correction value Dp2) are computed separately from each other, an adder 78 computes a final phase command value φ2 (=φt2+φp2) by adding the phase correction value φp2 to the phase correction value φt2 for torque control of the pulse voltage. An adder 77 computes a final duty ratio D2 (=Dt2+Dp2) of the pulse waveform voltage by adding the duty ratio correction value Dp2 to the basic duty ratio Dt2 of the pulse waveform voltage. These final phase command value φ2 and final duty ratio Dt are output as the final pulse waveform control information.

Then a pulse waveform voltage generation unit 79 computes the three-phase voltage command signals UU2, UV2 and UW2 (pulse waveform voltage signals) based on the final phase command value φ2 and the final duty ratio Dt of the pulse waveform voltage, and a rotor rotation position θ2 and a rotation speed N2 of the second AC motor 14. These three-phase voltage command signals UU2, UV2, UW2 are output to the inverter 28.

As described above, the torque control is executed to control the torque of the second AC motor 14 so as to realize the torque command value T2* output from the main control unit 31. Further, while maintaining the torque of the second AC motor 14 constant (torque command value T2*), the system voltage stabilization control is executed to suppress variation in the system voltage so that the difference ΔVs between the target value Vs* of the system voltage and the detection value Vsf is reduced by executing the input electric power control to vary the electric power input to the second MG unit 30 (second AC motor 14). In this case, the P-I controller 53 and the like units operate as system voltage control means.

Here, in the transient condition of the input electric power control of the second MG unit 30, when the current vector i2 of the second AC motor 14 greatly deviates from a constant torque curve (a curve representing a current vector which generates the same torque), uncomfortable torque fluctuation will be caused.

To counter this problem, a second torque estimation unit 84 computes a second estimated torque T2, which is an estimated torque that will be generated by the second AC motor 14, based on the detection motor current vector i2 (d-axis detection motor current id2, d-axis detection motor current iq2) of the second AC motor 14. Then, the torque variation zeroing control unit 85 executes the torque variation zeroing control so that the difference ΔTp2 between the first estimated torque Tt2 and the second estimated torque T2 is reduced to zero.

Figure 5:
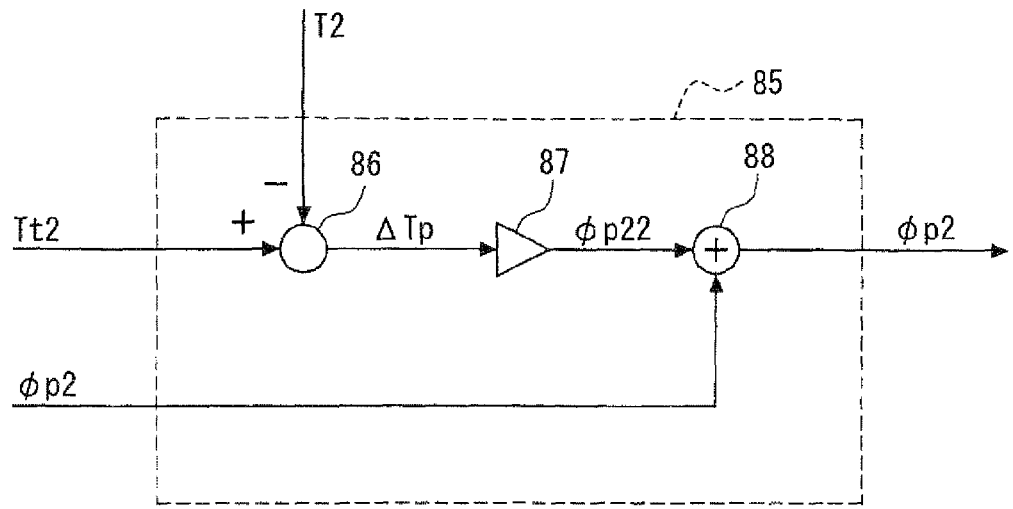
FIG. 5 is a block diagram showing a torque variation zeroing control unit of the torque and power control part shown in FIG. 3.

Specifically, as shown in FIG. 5, a subtractor 86 computes the difference ΔTp2 between the first estimated torque Tt2 and the second estimated torque T2. This difference ΔTp2 is applied to a P-I controller 87, which computes by P-I control or the like a correction value φp22 so that the difference ΔTp2 between the first estimated torque Tt2 and the second estimated torque T2 is reduced. An adder 88 computes a final phase correction value φp2 by adding the correction value φp22 to the phase correction value φp2. Thus, the phase correction value φp2 is corrected so that the difference ΔTp2 between the first estimated torque Tt2 and the second estimated torque T2 is reduced to zero substantially.

With such processing of the torque variation zeroing control unit 85, the current vector i2 of the second AC motor 14 is changed along the constant torque curve so that the torque of the second AC motor 14 is not varied in the transient time of the input electric power control of the second MG unit 30.

(Conversion Power Control)

After the start of system operation and the smoothing capacitor 24 has been sufficiently pre-charged, the motor control unit 37 halts the above conversion voltage control, and changes the operation over to conversion power control to control the output voltage of the voltage boosting converter 21 so as to decrease the difference Δpi between the command value Pif* and the detection value Pi of output electric power by the boosting converter 21.

When the command value Pif* of output electric power of the boosting converter 21 is to be computed, first, as shown in FIG. 2, the torque command value T1* and the rotation speed N1 of the first AC motor 13 are input to a first shaft output computation unit 56 to compute a shaft output PD1 of the first AC motor 13. Further, the torque command value T1* and the rotation speed N1 of the first AC motor 13 are input to a first output loss computation unit 57 to compute an output loss PL1 of the first AC motor 13. Thereafter, an adder 58 adds the output loss PL1 to the shaft output PD1 of the first AC motor 13 to compute an input power Pi1 to the first AC motor 13. In this case, when the first AC motor 13 is operating as a generator, the computation result of input power Pi1 to the first AC motor 13 assumes a negative value.

Further, the torque command value T2* and the rotation speed N2 of the second AC motor 14 are input to a second shaft output computation unit 59 to operate a shaft output PD2 of the second AC motor 14. Further, the torque command value T2* and the rotation speed N2 of the second AC motor 14 are input to a second output loss computation unit 60 to compute an output loss PL2 of the second AC motor 14. Thereafter, an adder 61 adds the output loss PL2 to the shaft output PD2 of the second AC motor 14 to compute an input power Pi2 to the second AC motor 14. In this case, when the second AC motor 14 is operating as a generator, the computation result of input power Pi2 to the second AC motor 14 assumes a negative value.

Thereafter, the input power Pi1 to the first AC motor 13 and the input power Pi2 to the second AC motor are added up together through an adder 62 to compute a total electric power Pi*. The total electric power Pi* is input to a second low pass filter 63 so as to be subjected to the low pass filtering process permitting the passage of components in a low-frequency region only of the total electric power Pi*. The total electric power Pif* after being subjected to the low pass filtering is regarded to be the command value Pif* for the conversion power. The adder 62 and the second low pass filter 63 operate as conversion power command value computation means.

When the detection value Pi of output electric power of the voltage boosting converter 21 is to be computed, a detection value ic of current output from the voltage boosting converter 21 detected by the current sensor 26 is input to a third low pass filter 64 and is subjected to the low pass filtering process permitting the components in the low-frequency region only to pass through in the detection value ic of current output from the voltage boosting converter 21. A conversion power detection unit 65 multiplies the target value Vs* of the system voltage by the detection value icf of current output from the voltage boosting converter 21 after having been subjected to the low pass filtering in order compute a detection value Pi of the conversion power. The detection value Vsf of the system voltage may be multiplied by the detection value icf of the output current to compute the detection value Pi of the output power.

Thereafter, a difference ΔPi between the command value Pif* and the detection value Pi of output electric power of the voltage boosting converter 21 is computed by a subtractor 66. The difference ΔPi is input to a P-I controller 67 (conversion power control amount computation means), and a current duty ratio Dc of a switching element (not shown) in the voltage boosting converter 21 is computed by P-I control so as to decrease the difference ΔPi between the command value Pif* and the detection value Pi of output electric power of the voltage boosting converter 21. Then, a voltage boosting drive signal computation unit 68 computes a voltage boosting drive signals UCU, UCL based on the current duty ratio Dc, and outputs the computed drive signals UCU and the UCL to the boosting converter 21.

Thus, the conversion power control is executed to control the output electric power of the voltage boosting converter 21 so as to decrease the difference ΔPi between the command value Pif* and the detection value Pi of the output electric power of the voltage boosting converter 21. Thus, the electric power supplied to the power line 22 by the voltage boosting converter 21 can be controlled as desired. In this case, the P-I controller 67, the voltage boosting drive signal computation unit 68 and the like operate as conversion power control means.

As described above, in controlling the second AC motor 14 in the pulse waveform control method, the input electric power to the second MG unit 30 is so controlled that the difference ΔVs between the target value Vs* and the detection value Vsf of the system voltage is decreased to execute the system voltage stabilization control in order to suppress variation in the system voltage (voltage of the power supply line 22). Therefore, even when the power balance greatly varies between the two AC motors 13 and 14 due to changes in the operating conditions of the vehicle, the system voltage can be effectively stabilized. Besides, the voltage of the power supply line 22 can be highly stabilized without using the voltage boosting converter 21 of high performance or without using the smoothing capacitor 24 of a large capacity, satisfying the requirement of realizing the system in a small size and at a decreased cost.

Further, the pulse waveform information (phase command value φt2, basic duty ratio Dt2) for torque control and the pulse waveform information (phase correction value φp2, duty ratio correction value Dp2) for electric power control are computed independently. Then the final pulse waveform control information (final phase command value φ2, final duty ration Dt) is computed based on these pulse waveform control information for torque control and pulse waveform control information for electric power control. Thus, the torque control of the second AC motor 14 and the input electric power control of the second MG unit 30 are executed independently from each other. As a result, the torque control of the second AC motor 14 and the input electric power control of the MG unit 30 are prevented from interfering each other and are stabilized well.

In executing the system voltage stabilization control, the system voltage is controlled by controlling the input electric power of the second MG unit 30 while maintaining the torque of the second AC motor 14 at a substantially constant value (torque command value T2*). As a result, the system voltage is prevented from varying without affecting adversely to vehicle operating conditions.

The first estimated torque Tt2 is computed based on the torque control detection current vector it2 of the second AC motor 14, and the second estimated torque T2 is computed based on the motor detection current vector i2 of the second AC motor 14. Further, the torque variation zeroing control, which corrects the phase correction value φp2 of the pulse waveform voltage, is executed to reduce the difference ΔTp2 between the first estimated torque Tt2 and the second estimated torque T2 to zero substantially. As a result, in the transient condition of controlling the input electric power of the second MG unit 30, the current vector i2 of the second AC motor 14 can be changed in line with the constant torque curve so that the torque of the second AC motor 14 is restricted from varying. Thus, uncomfortable torque variation is suppressed.

The above embodiment may be modified in many ways.

For example, in the conversion power control, the input electric power of the voltage boosting converter 21 may be controlled to reduce a difference between the command value and the detection value of the input electric power of the converter 21, in place of controlling the output electric power of the converter 21 to reduce the difference ΔPi in the input electric power.

In the system voltage stabilization control, the system voltage variation may be suppressed by controlling the input electric power of the first MG unit 29 (first AC motor 13) in place of controlling the input electric power of the second MG unit 30.

In addition, in a all-wheel-driven vehicle which has a third MG unit mounted on a driven wheel, the system voltage may be stabilized to suppress system voltage variation by controlling the input electric power of the third MG unit.

The above embodiments are directed to a hybrid vehicle of the so-called split type, which splits the motive power of the engine through the planetary gear mechanism. Not being limited to the hybrid vehicle of the split type, however, the embodiment may be hybrid vehicles of other types, such as a parallel type and a series type. In the above embodiment, further, the vehicle uses the AC motor and the engine as motive power sources. However, the vehicle may use the AC motor only as a motive power source. The vehicle may have only one MG unit comprising an inverter and an AC motor, or three or more MG units.

What is claimed is:

1. A control apparatus for an electric vehicle comprising:
 a conversion means that converts a voltage supplied by a DC power source into a system voltage appearing on a power supply line;

an MG unit that includes an inverter connected to the power supply line and drives an AC motor;

a torque and power control means for controlling a torque of the AC motor and an input electric power of the MG unit by supplying the AC motor with a pulse waveform voltage, which commutates the AC motor at every predetermined electric angle, based on a torque command value of the AC motor and an input electric power command value of the MG unit; and a system voltage control means for stabilizing the system voltage by outputting the input electric power command value to the torque and power control means, so that a system voltage variation which is a variation from a target value of the system voltage is suppressed by input electric power control of the MG unit, wherein the torque and power control means includes:

current separation means for separating a torque control detection current related to torque control of the AC motor from a detection motor current flowing in the AC motor;

torque control means for computing a first estimated torque of the AC motor based on the torque control detection current, setting a torque control phase command value of the pulse waveform voltage based on the first estimated torque and the torque command value, and outputting, as torque control pulse waveform information, both of the torque control phase command value and a predetermined duty ratio;

power control means for setting and outputting, as electric power control pulse waveform information, both a phase correction value and a duty ratio correction value, the electric power control pulse waveform information being for correcting the torque control pulse waveform information so that the input electric power of the MG unit is controlled to the input electric power command value independently of the input electric power of the MG unit required to generate torque of the AC motor based on the torque command value and the input electric power command value;

pulse waveform voltage generation means for outputting to the inverter a pulse waveform voltage signal, which is to be applied to the AC motor, based on the torque control pulse waveform information, the electric power control pulse waveform information and the electric angle of the AC motor; and torque variation zeroing control means for computing a second estimated torque of the AC motor based on the detection motor current and controlling a difference between the first estimated torque and the second estimated torque to zero substantially, thereby to suppress torque variation of the AC motor in a transient condition of input electric power control of the MG unit.

2. The control apparatus according to claim 1, wherein the current separation means computes the torque control detection current based on at least a basic waveform voltage of the pulse waveform voltage to be applied to the AC motor, a basic waveform current of the detection motor current and the torque control pulse waveform information.

* * * * *